April 17, 1945.  F. TURRETTINI  2,373,929
PROJECTION APPARATUS
Filed Oct. 27, 1942   2 Sheets-Sheet 1
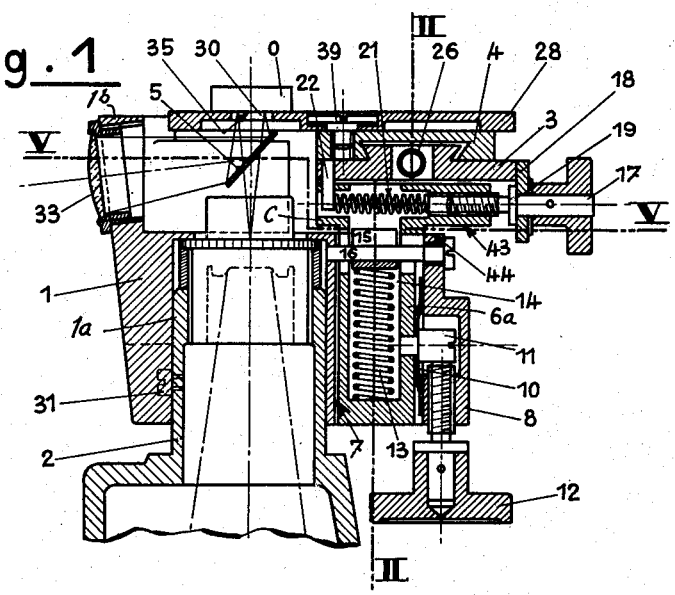
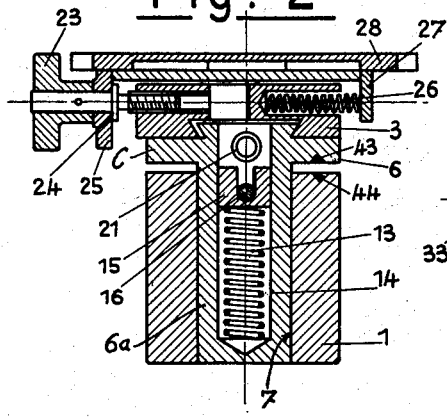
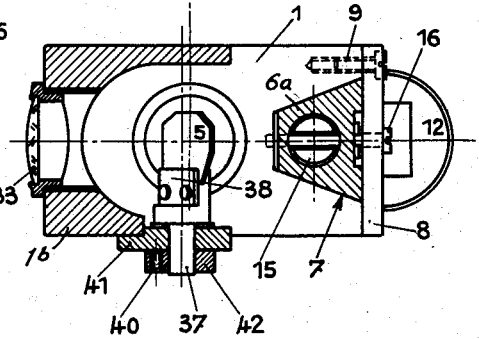
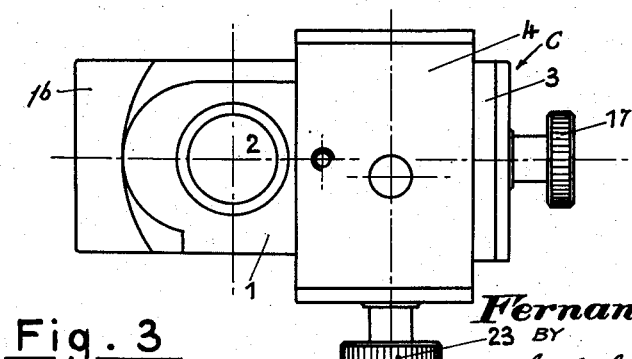
INVENTOR
Fernand Turrettini,
BY
ATTORNEYS.

Patented Apr. 17, 1945

2,373,929

UNITED STATES PATENT OFFICE 2,373,929

PROJECTION APPARATUS

Fernand Turrettini, Bellevue-Geneva, Switzerland

Application October 27, 1942, Serial No. 463,533
In Switzerland February 7, 1942

9 Claims. (Cl. 88—24)

All projecting apparatus are provided with an object table, adjustable in height, so as to enable the objects to be observed to be focussed. They are also provided with a set of objectives and condensers of different characteristics so as to enable a number of magnifications to be obtained with diascopic or episcopic illumination of the object to be observed according to its nature.

The objectives of large magnification have necessarily a very short frontal distance which is a cause of difficulty in positioning mirrors for episcopic illumination which must preferably be located between the objective and the object to be examined.

The necessary material thickness of the object table and the overall dimensions of these mirrors make it difficult to place them in a very short frontal distance. The slides of the object table moving in immediate proximity to the illuminating mirrors and also the necessity of replacing the objective used by another objective for changing the magnification, is liable to cause collisions between the members which are too close to one another.

The present invention has for its subject an object examination unit for a projection apparatus which eliminates the disadvantages referred to by the fact that it is provided with a removable body adapted to be placed on the mounting of an objective and which itself carries the object table and an episcopic illuminating device.

A form of construction of the device forming the subject of the invention is shown diagrammatically and by way of example in the accompanying drawings, wherein:

Fig. 1 is a view in axial section.

Fig. 2 is a sectional view on the line II—II of Fig. 1.

Fig. 3 is a plan view, the rotary table being retracted.

Fig. 5 is a sectional view on the line V—V of Fig. 1.

Figure 4:
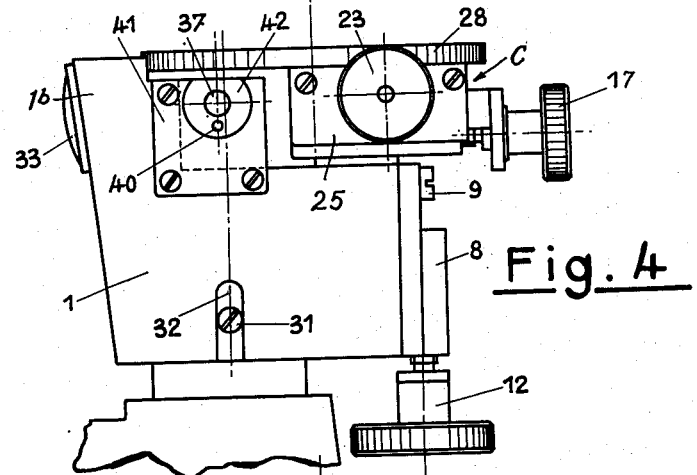
Fig. 4 is a view in elevation.
Figure 6:
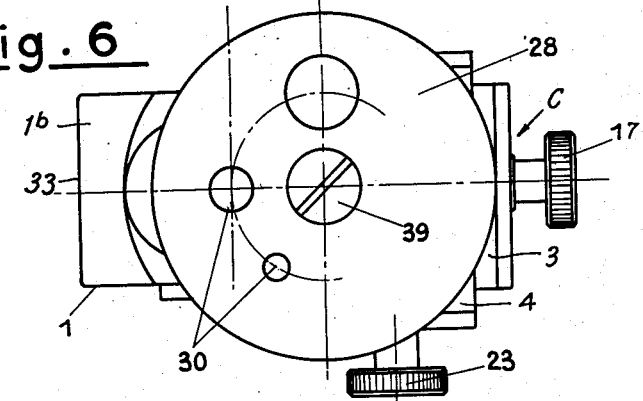
Fig. 6 is a plan view.

According to the embodiment of the invention shown in the drawings, the same essentially includes an object examination unit primarily including a body 1 adapted to be removably fitted over the tubular support or mounting 2 of an objective lens and having novel features of construction. The said body 1 is formed with a main inner bore 1a providing a socket which permits the body to be telescopically fitted over the tubular objective support 2, Figure 1. The upper portion of the body is provided at its front with an upstanding mask or wall portion 1b which is of substantially U-shape in horizontal cross section (Figure 5) and whose front face is formed with an opening for receiving a lens 33. The focal axis of this lens intersects the vertical focal axis of the objective lens at a predetermined angle as shown by the dotted lines in Figure 2. The upper surface of the body 1 at the rear of the wall 1b is provided with a table carrier C including two cross slides 3 and 4, the latter rotatably supporting an object table 28. Substantially at the zone of intersection of the focal axes of the lenses above described, there is provided an adjustable mirror 5 for the episcopic illumination of the object O to be examined and supported on the rotatable object table 28, which in part overlies the position of the mirror 5.

The two slides 3 and 4 are mounted on the base 6 of the carrier C, the said base having a substantially vertically disposed depending post 6a whose transverse cross section conforms to a guideway 7 in the lower rear portion of the body. As will be observed from Figures 1 and 5, the post 6a and guideway 7 have their opposite side walls formed to inwardly converge in wedge-like formation, thereby to make the guideway of substantially V-shape in horizontal cross section. The rear face of the body 1 in the zone of the guideway 7 is covered by a plate 8 rigidly secured to the body by screws 9. A flat spring 10 located between plate 8 and the post 6a tends to push the latter towards the narrow bottom of the guideway in such manner as to eliminate any possibility of horizontal play between the post and the guideway.

This spring 10 is held in position by a pin 11 secured to the post 6a. The movement of the latter, parallel to the optical axis, is controlled by a screw 12 which screws into the plate 8 and of which the end is held in contact with the pin 11 by a spring 13 located in a recess 14 provided in the support 6. This spring 13, bearing against the body 1 by means of a notched member 15 straddling a rod 16 secured in the body 1 and the plate 8, tends to push down the post 6a and therefore to hold the pin 11 in contact with the end of the screw 12, thus ensuring an adjustment without play, in its two directions of movement.

On the upper part of the carrier 6 are mounted the two cross slides 3 and 4 moving perpendicularly one relatively to the other in planes perpendicular to the optical axis.

A screw 17, screwing into the carrier 6, controls the movements of the slide 3. A plate 18, rigidly secured to the end of this slide, is held in contact with a collar 19, secured to the screw 17 by a spring 21 lodged in a recess provided in the carrier or support 6. This spring, bearing against the bottom of the recess, exerts a pressure on a pin 22 secured in the slide 3 and thus tends to hold the plate 18 in contact with the collar 19. The spring 21 thus ensures the control, without play, of the slide 3 in its two directions of movements.

The control, without play, of the slide 4 is effected in a similar manner. A screw 23, screwing into the slide 3, carries a collar 24 held in contact with a member 25 secured to the slide 4 by a spring 26 lodged in a recess provided in the slide 3. This spring, bearing against the latter, exerts pressure on a stop 27 secured to the slide 4.

A rotary object table 28 is secured to the slide 4 by a pivot screw 29. The rotary table has openings 30 of variable section and shape which are selected according to the dimensions and the shape of the object O to be examined.

The exact angular position of the removable body, relatively to the mounting of the objective is determined by a pin 31 fixed in the mounting and engaging with a groove 32 provided in the body 1 (Fig. 4).

The beam of rays emanating from a luminous source (not shown) is directed by a lens 33, secured to the removable body, on to a reflecting surface formed in the particular case by a transparent blade 5. This blade reflects the luminous rays on to the lower surface 35 of the object O. The rays reflected by this surface 35 partly pass through the objective on to a screen (not shown).

The blade 5 is secured to a shaft 37 by frame 38. This shaft is pivoted in a member 41 rigidly secured to the body 1. A ring 42, secured to the end of this shaft enables the inclination of the blade 5 to be adjusted. The exact angular position of the latter may be fixed by means of a pointed screw 40 screwed into the ring 42 and of which the end bears against the member 41.

Figure 7:
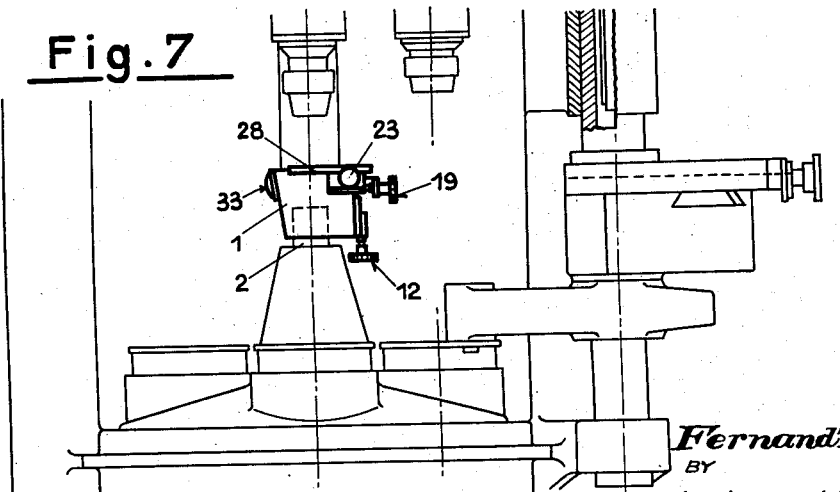
Fig. 7 shows the device on the mounting of an objective of a projection apparatus provided with an eclipsable object table.

Fig. 7 shows the devices, forming the subject of the invention, mounted on one of the objectives of a projection apparatus provided with an eclipsable object table according to Swiss Patent 218,410. The rotary object table 28 is shown in its eclipsed position and it will be seen that the free distance between the objective and its condenser permits a large and sufficient access for the mounting of the removable body provided with the support with a vertical way and of its rotary object table carried by two cross slides.

After use this device is withdrawn and the table 28 is returned into its operative position.

It will be understood that this device may be used in other projection apparatus provided that these latter are provided with object tables capable of being withdrawn from their operative position.

The operation is carried out in the same way as with a known episcopic projection apparatus. The cross slides enable the object having to be examined to be placed in the optical axis of the objective, whilst the vertical guide enables the image to be focussed on the screen.

In order to avoid any collision between the transparent blade 5 and the object table 28, the downward movement of the support 6 is limited by a surface 43, provided on the support 6, coming into contact with a surface 44 provided on the removable body 1.

Other forms of construction of the device described may be provided. For example the control of the support 6 and of the slides 3 and 4 may be effected by means of a rack or any other known devices.

It will be seen that by reason of the device described, no collision between the various members is to be feared. In fact after fixing the removable body on the mounting of the objective, all these members form part of the same assembly.

I claim:

1. In a projection apparatus, an object examination unit for removable and replaceable engagement with the holder of an objective lens, comprising, a body having a bore forming a socket adapted to telescope over said holder, and also having a guideway whose longitudinal axis is parallel to the longitudinal axis of the socket, means on the front of the body for mounting a lens whose focal axis intersects the focal axis of the objective lens, a bracket carried by one side of the body, a mirror rotatably supported on a horizontal axis in said bracket, said mirror adapted for manual adjustment on its axis relative to the focal axes of both lenses, a table carrier at the rear of said body and having a depending post adapted to fit in said guideway thereof, cooperating means on the body and post for longitudinally moving the latter in said guideway, means for holding said post in the guideway against movement transversely thereof, and lower and upper slide members supported on the carrier and having inter-engaging cooperating means whereby they may be moved at right angles to each other, and an object table rotatably mounted on the said upper slide member.

2. In a projection apparatus, an object examination unit, according to claim 1, wherein the post and the guideway are of transversely wedge-shape cross section and are held against movement at right angles to the axis of the guideway by spring means interposed between the rear face of the post and an inner adjacent face of the body forming a part of said guideway.

3. In a projection apparatus, an object examination unit, according to claim 1, wherein the said post is hollow and closed at its lower end while its side portions near the open top thereof are provided with opposite alined slots, a rod in the body extending through said slots of the post, a spring bearing member having a notch straddling said rod, a spring confined between the said bearing member and the closed lower end of the post whereby said spring tends to push the post downwardly in said guideway, a pin projecting laterally from said post, an adjusting screw fitted in the body at right angles to the pin and movable in a direction parallel to the axis of the post to engage said pin, the inner end of the screw and said pin being maintained in engagement due to the said spring forcing the post downwardly whereby manipulation of said screw against the pin will shift the post in said guideway.

4. In a projection apparatus, an object examination unit, according to claim 1, wherein the lower slide member has a tongue and groove sliding connection with the carrier, a downwardly projecting pin near one end of the slide and a downwardly projecting plate at the other end, a screw for controlling the movement of the slide and having a collar engaging the inner face of the plate, said screw engaging a threaded opening in the carrier, and a coil spring mounted coaxially with the axis of the screw and having its opposite ends respectively confined between said pin and a recess in the carrier at the inner end of the threaded opening which receives the screw, whereby said plate is held in contact with the collar and adjustment of the slide may be effective without play as the screw moves the slide in opposite directions.

5. In a projection apparatus, an object examination unit, according to claim 1, wherein the upper slide member has a tongue and groove connection with the lower slide member and also has a recess in one end, abutments at opposite ends of the slide member, a screw swivelled in one of the abutments and having engagement with a threaded opening in the slide at the end thereof opposite the recess, and a spring confined between the bottom of the recess and the abutment opposite the screw, whereby the latter will shift the slide without play in opposite directions.

6. In a projection apparatus, an object examination unit, according to claim 1, wherein the portion of the body which telescopes over the holder and the holder respectively have cooperating interengaging parts to prevent relative rotation of the body on the holder.

7. In a projection apparatus, an object examination unit, including, a body having a socket for removable and replaceable engagement with the holder of an objective lens, lens mounting means at one side of the body, an object supporting table means at the side of said body opposite the lens, said means including a vertically movable member and a plurality of superimposed horizontally movable members carried by said vertically movable member, and an object supporting table carried by one of said horizontally movable members and having a portion thereof movable above the upper end of said socket.

8. In a projection apparatus, an object examination unit, including, a body having a socket for removable and replaceable coaxial engagement with the holder of an objective lens, lens supporting means at one side of the socket, table carrier means on the body and at the side of the socket opposite the lens supporting means, said means including a post adjustable vertically in the body, means for preventing lateral movement of the post relative to the body, a plurality of superimposed interconnected slide members mounted on the post for horizontal adjustment relative to each other and to the post, a table rotatably mounted on one of the slide members and having a portion thereof overlying said socket, and a mirror adjustably supported on the body between said lens supporting means and the table carrier.

9. An object examination unit for removable and replaceable engagement with the objective lens holder of projection apparatus utilizing diascopic or episcopic illumination of the object to be observed, comprising, a body having a bore forming a socket adapted to be fitted over the said holder, lens supporting means at the front of the body, a table carrier mounted at the rear of the body and including a member adjustable vertically in the body and surmounted by a plurality of horizontally adjustable slide members, an object table rotatably supported on one of the horizontal members for movement above the upper end of the socket, and a mirror adjustable on a horizontal axis carried by the body and located between the lens support and the carrier and disposed beneath a portion of the table.

FERNAND TURRETTINI.